(12) United States Patent
Smallhorn (10) Patent No.: US 10,017,255 B2
(45) Date of Patent: Jul. 10, 2018

(54) POWER/DATA OUTLET ADJUSTABLE SEAT BRACKET

(71) Applicant: INFLIGHT INVESTMENTS INC., St-Laurent (CA)

(72) Inventor: George R. Smallhorn, St-Laurent (CA)

(73) Assignee: INFLIGHT INVESTEMENTS INC., St. Laurent (CA)

( * ) Notice: Subject to any disclaimer, the term of this patent is extended or adjusted under 35 U.S.C. 154(b) by 0 days.

(21) Appl. No.: 15/823,911

(22) Filed: Nov. 28, 2017

(65) Prior Publication Data

US 2018/0148177 A1 May 31, 2018

Related U.S. Application Data

(60) Provisional application No. 62/427,223, filed on Nov. 29, 2016.

(51) Int. Cl.
| H01R 13/60 | (2006.01) |
| B64D 11/06 | (2006.01) |
| H01R 13/73 | (2006.01) |
| H01R 24/52 | (2011.01) |

(52) U.S. Cl.
CPC ......... B64D 11/0624 (2014.12); H01R 13/73 (2013.01); *H01R 24/525* (2013.01); *H01R 2201/26* (2013.01)

(58) Field of Classification Search
CPC .............................. H01R 24/525; H01R 13/73
See application file for complete search history.

(56) References Cited

U.S. PATENT DOCUMENTS

| 4,059,328 | A  | * | 11/1977 | Rigo ........................ | H02B 1/42 |
| | | | | | 174/53 |
| 7,063,562 | B2 | * | 6/2006 | Henley .................... | B64C 1/18 |
| | | | | | 439/34 |
| 7,086,874 | B2 | * | 8/2006 | Mitchell ................ | B64D 11/06 |
| | | | | | 244/118.6 |
| 7,172,155 | B2 | * | 2/2007 | Feist ....................... | B60N 2/06 |
| | | | | | 174/70 R |
| 7,185,850 | B2 | * | 3/2007 | Callahan .............. | B60N 2/0725 |
| | | | | | 174/74 R |
| 7,207,523 | B2 | * | 4/2007 | Callahan ............. | B60R 16/0207 |
| | | | | | 174/10 |
| 8,087,952 | B2 | * | 1/2012 | Van Der Mee .......... | B60N 2/06 |
| | | | | | 439/501 |
| 2011/0079682 | A1 | * | 4/2011 | Raybell .................. | B64D 11/06 |
| | | | | | 244/122 R |

OTHER PUBLICATIONS

European Patent Office; European Search Report dated Apr. 19, 2018 re: EP Application No. 17020552.0.

* cited by examiner

*Primary Examiner* — Tho D Ta
(74) *Attorney, Agent, or Firm* — Norton Rose Fulbright Canada LLP; Paul J. Field (57) ABSTRACT

The invention provides a means by which AC or USB power/data outlets can be installed onto aircraft passenger seats by an underhung mounting bracket that can be quickly installed with flexible cable ties or adjustable straps to the beams of a passenger aircraft seat, and provides sufficient adjustment in length to accommodate a variety of aircraft seat structures.

11 Claims, 12 Drawing Sheets

POWER/DATA OUTLET ADJUSTABLE SEAT BRACKET

TECHNICAL FIELD

The invention relates to an electric power and data outlet, AC or USB, for mounting with an adjustable bracket to the structure of an aircraft passenger seat.

BACKGROUND OF THE ART

Aircraft passenger entertainment and inflight communications services often includes an electrical AC power outlet or USB port for powering and recharging batteries in various electronic devices. The USB port can also serve as a communication link to the internet, satellite or onboard content. Any aircraft seat assembly may have been originally configured without power or communications outlets. Retrofitting passenger seats with such outlets frequently occurs.

Passenger aircraft seats have a metal chassis structure including legs removably mounted to longitudinal seat tracks in the cabin floor. Seat backs, seat pads and armrests are mounted to the chassis. The chassis includes beams that span laterally between the longitudinal leg assemblies.

Passenger aircraft seats must comply with rigid safety standards. Minimal modifications that do not significantly add weight or modify the structure are permitted. Significant modification of an existing seat structure or added weight are avoided if possible since the modified seat requires re-testing to ensure that safety standards are met. Aircraft downtime also represents a significant cost to an airline, and modifications that involve minimal time on the ground are preferred.

Therefore modifying existing passenger seats that do not have electric AC power or USB outlets, to include power and USB ideally is done without incurring significant delays, involving minimal labour costs, without requiring seat retesting and minimizing idle aircraft. Further, the space available for added equipment is very limited around passenger aircraft seats for passengers and their luggage. Added equipment must be robust and quickly repairable to withstand impact and contamination with food or beverages.

Features that distinguish the present invention from the background art will be apparent from review of the drawings of the invention described below.

DISCLOSURE OF THE INVENTION

The invention provides an AC or USB power/data outlet and underhung mounting bracket that can be quickly installed with cable ties to the beams of a passenger aircraft seat, and provides sufficient adjustment to accommodate the wide variety of aircraft seat structures currently in operation.

The invention provides for an adjustable bracket that allows the quick, easy and certifiable installation of electric power and data ports on an aircraft passenger seat, the seat including a frame with a forward lateral beam spaced apart from a rear lateral beam by a distance; the bracket comprising: a forward arm having a forward flexible strap connector adapted to surround the forward lateral beam; a rear arm having a rear flexible strap connector adapted to surround the rear lateral beam; an adjustable length connector joining the forward and rear arms for accommodating variation in said distance; an outlet support disposed on a forward or rearward facing portion of the rear arm; and an electric power cartridge having a forward or rearward facing power/data outlet connected to the outlet support.

DESCRIPTION OF THE DRAWINGS

In order that the invention may be readily understood, one embodiment of the invention is illustrated by way of example in the accompanying drawings.

DETAILED DESCRIPTION

Figure 1:
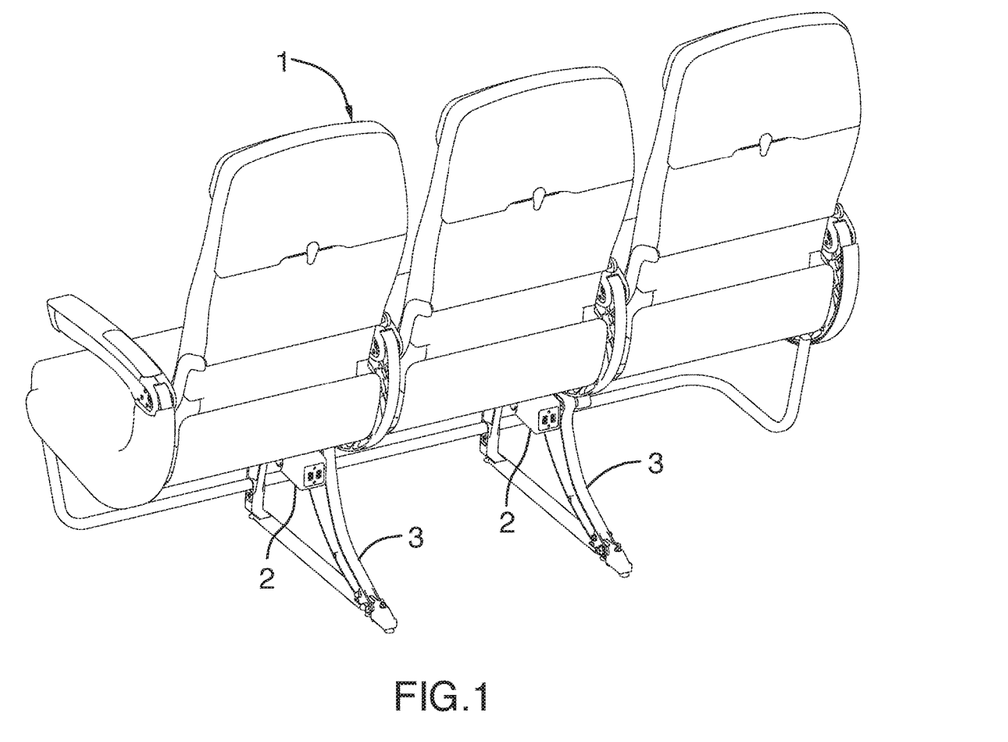
FIG. 1 is a rear-left perspective view of a three seat assembly with two electric power outlet brackets disposed adjacent the two leg frames that are secured to the cabin floor in seat tracks (not shown).
Figure 2:
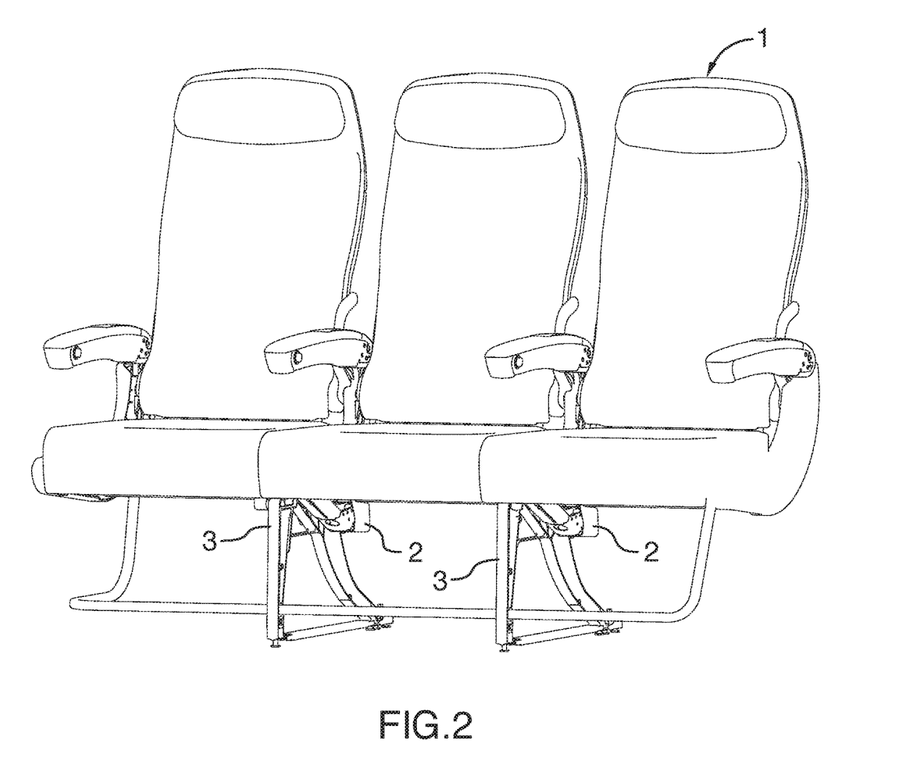
FIG. 2 is a front-left perspective view of the three seat assembly of FIG. 1 showing two electric power outlet brackets underhung below the seats.
Figure 3:
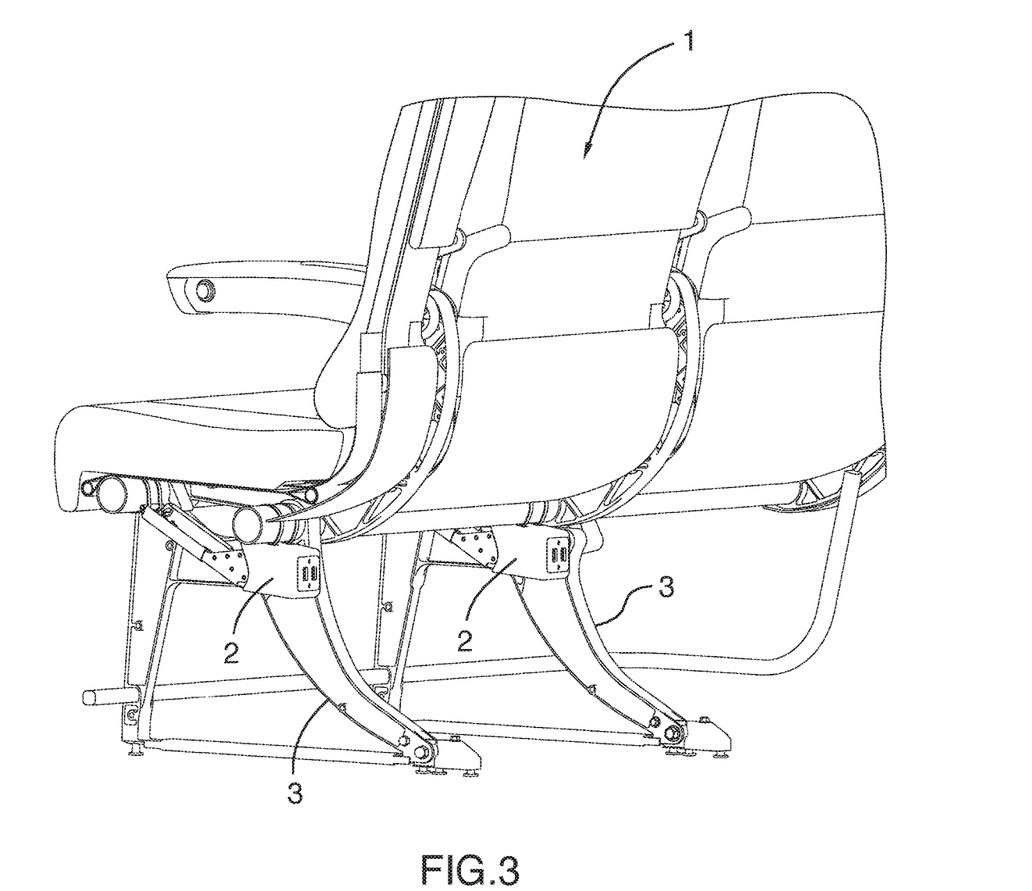
FIG. 3 is a rear-left detail perspective view showing two cylindrical tube lateral beams to which the two electric power outlet brackets are attached with flexible straps, such as zip ties or cable ties
Figure 4:
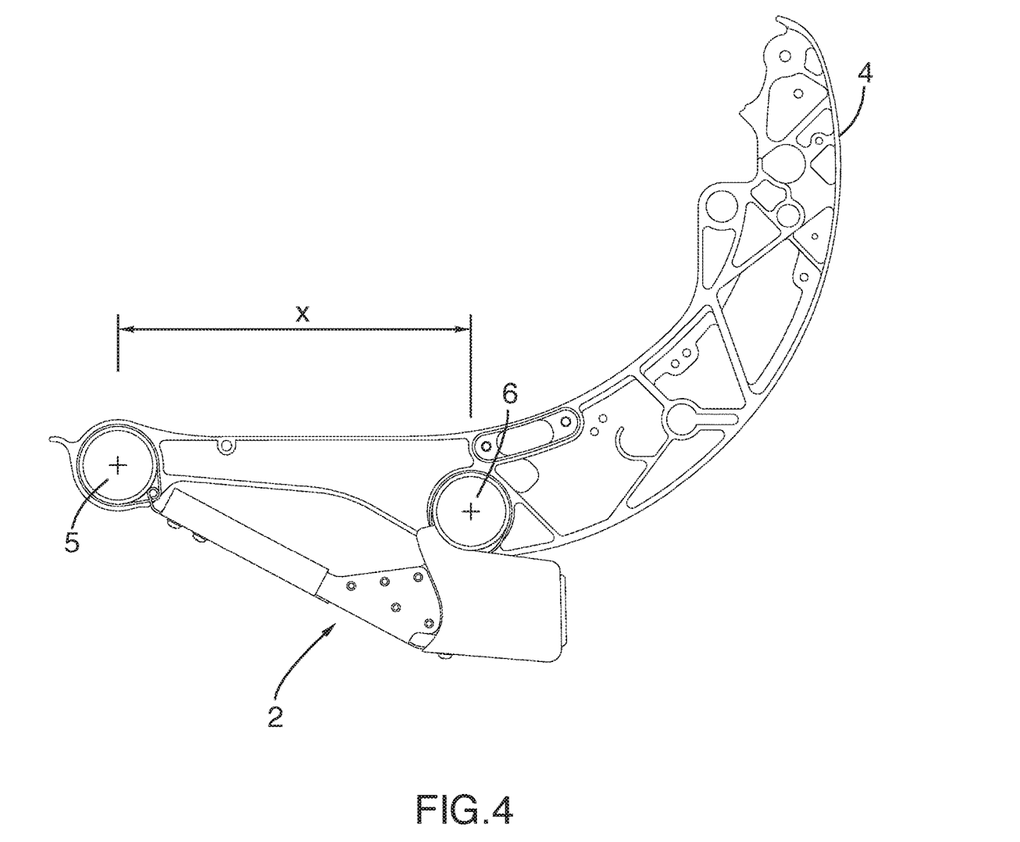
FIG. 4 is a detail left side view of the electric power outlet bracket, two cylindrical tube lateral beams and seat frame member, with flexible straps surrounding the beams to attach the bracket.
Figure 5:
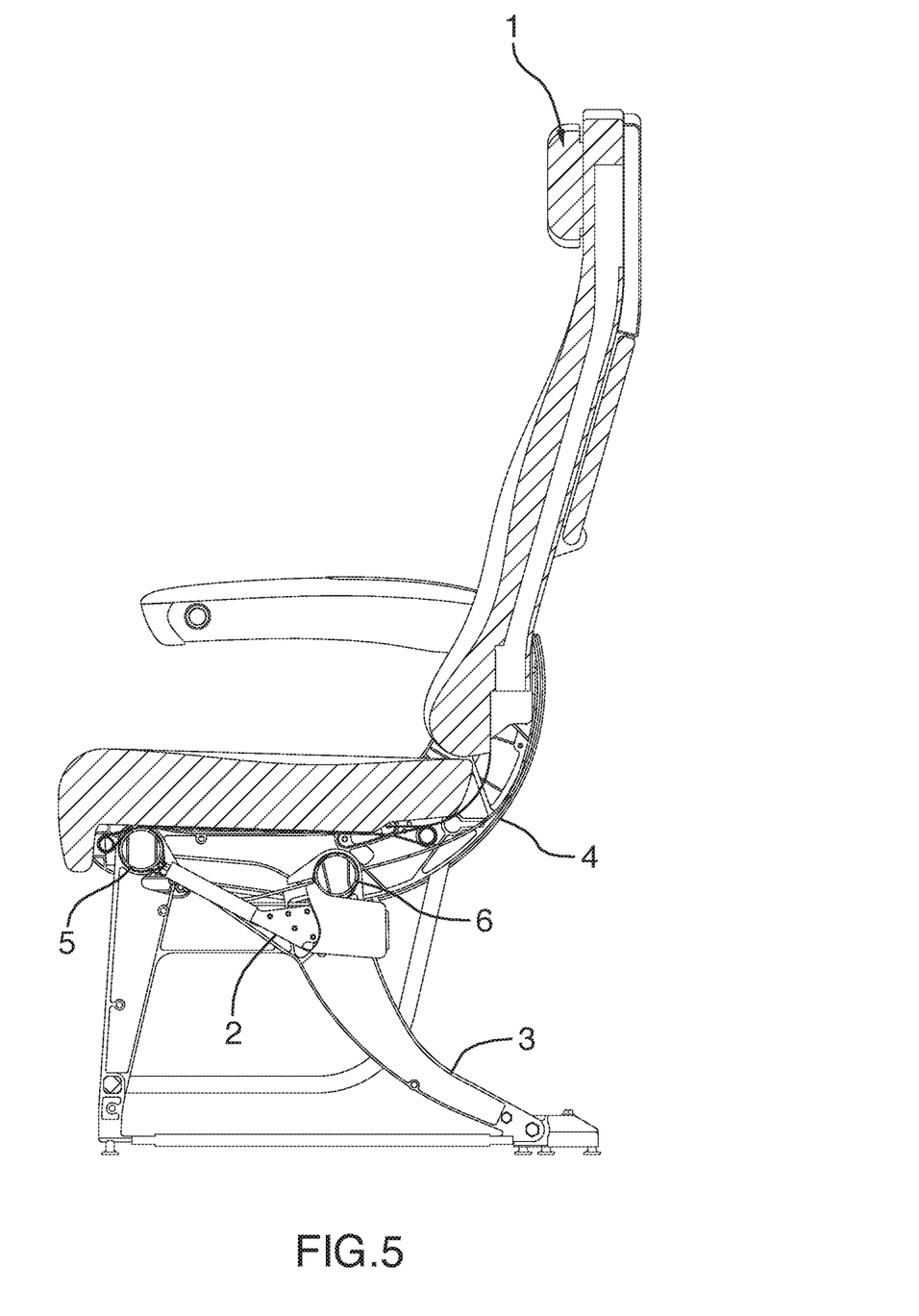
FIG. 5 is a longitudinal sectional view showing the environment or context for the detail in FIG. 4.

FIGS. 1 to 3 show perspective views of a three seat assembly 1 with two electric power outlet brackets 2 disposed adjacent the two leg frames 3 that are secured to the cabin floor in seat tracks. As seen in FIGS. 4-5, the seat assembly 1 includes a cast aluminum seat frame 4 supported on the leg frame 3.

The seat frame 4 is secured to a forward lateral beam 5 spaced apart from a rear lateral beam 6 by a distance "x". The sizes of seats varies between manufacturers and models somewhat to accommodate different seat spacing, different airline cabin choices, aircraft types and passenger service classes (economy, business, first class, etc.). Accordingly, the distance "x" can vary between different seat designs. It will be understood that although the drawings show the bracket 2 facing rearwardly, the same bracket 2 can be installed to face forwardly with minimal modification.

Figure 6:
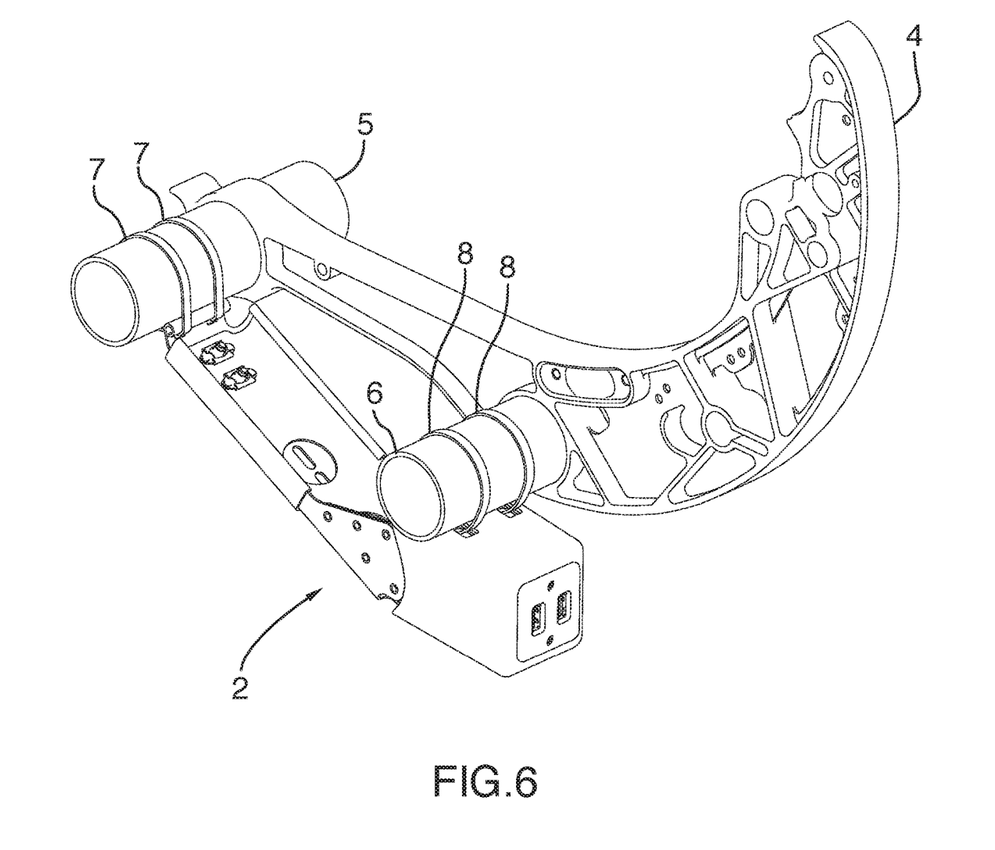
FIG. 6 is a rear left perspective of the bracket, straps, beams and seat frame member of FIG. 4
Figure 7:
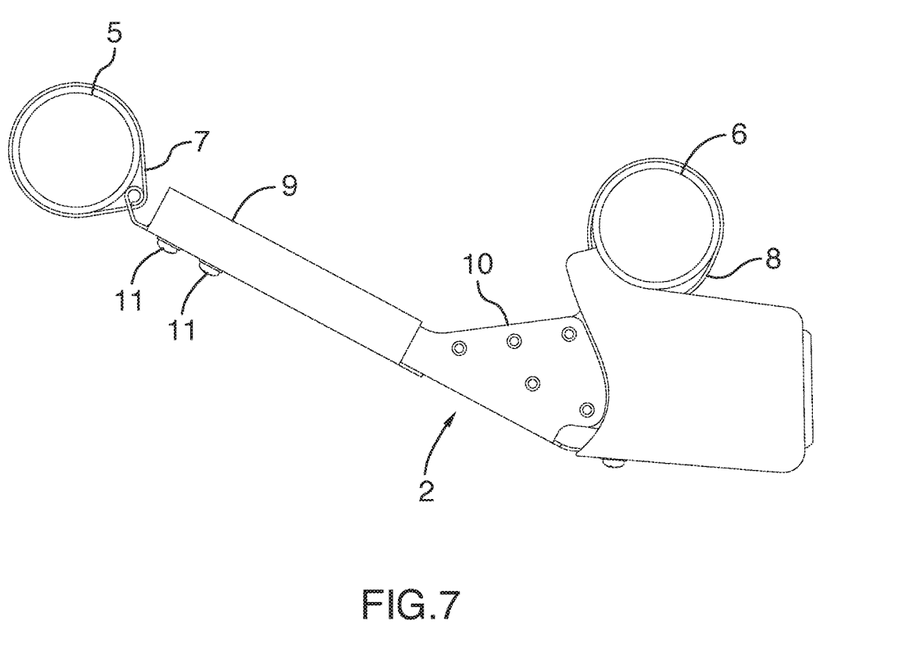
FIG. 7 is a left side view of the beams, straps and bracket of FIG. 6.
Figure 8:
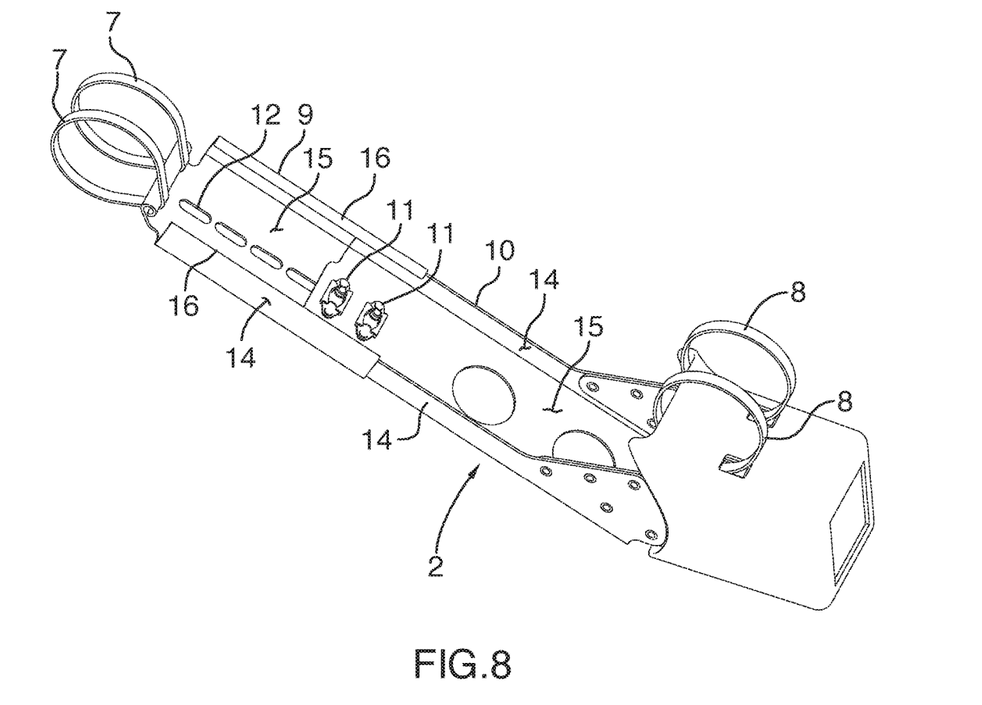
FIG. 8 is a top-rear view of the bracket in an extended position with loops of straps for mounting to the beams.

FIG. 6 shows the bracket 2 mounted to cylindrical lateral beams 5, 6 using flexible straps connectors 7, 8. FIGS. 7 and 8 show further details where the metal bracket 2 is made adjustable in length to accommodate different distances "x" (see FIG. 4) between forward and rear lateral beams 5, 6. The forward arm 9 and rear arm 10 are connected together with removable bolts 11 in slotted apertures 12 to form an adjustable length connection. FIG. 7 shows the arms 9 and 10 in a shortened position whereas FIG. 8 shows the same arms 9 and 10 in an extended position, dependent on the spacing between beams 5, 6 (i.e. distance "x" in FIG. 4).

As seen in FIGS. 6 and 7, the forward arm 9 has a pair of forward flexible strap connectors 7 adapted to surround the forward lateral beam 5. The rear arm 10 having a pair of rear flexible strap connectors 8 adapted to surround the rear lateral beam 6. Preferably the forward and rear flexible strap connectors 7, 8 are adjustable in length because beams 5, 6 may vary in size and shape and to make the brackets 2 capable of being mounted to a wide variety of seat designs.

Figure 9:
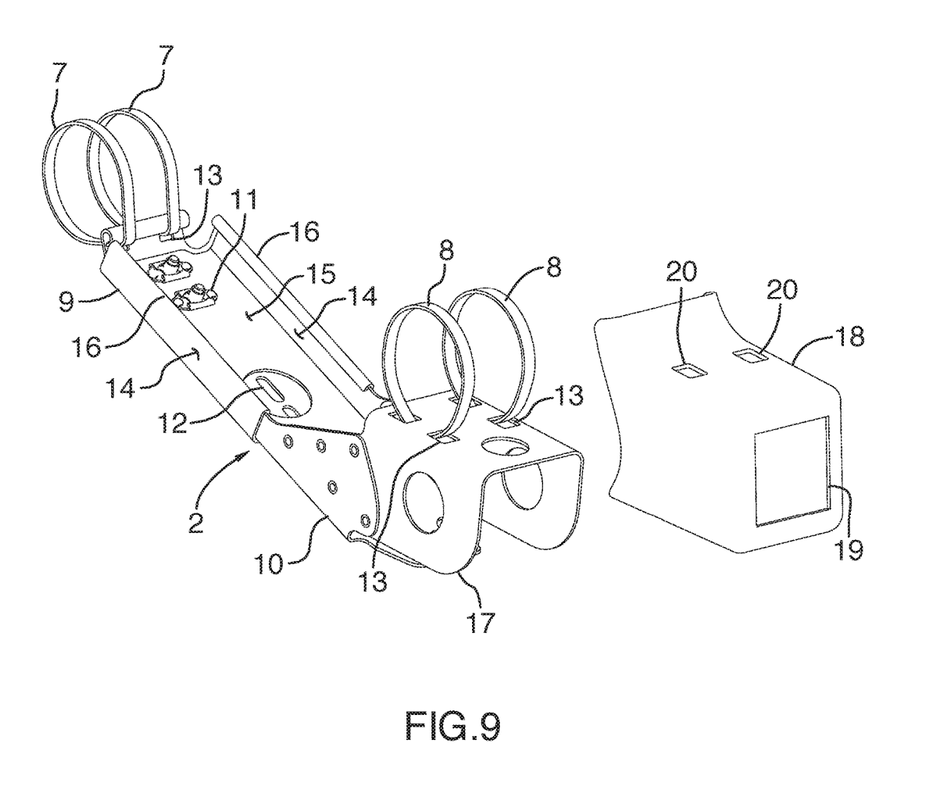
FIG. 9 is an exploded view of the cover, housing and bracket in a shortened position.

The forward and rear arms 9, 10 include strap apertures 13 through which the flexible strap connectors extend 7, 8 as best seen in FIG. 9.

The forward and rear flexible strap connectors 7, 8 can be common lightweight cable ties or zip ties that are widely available at hardware or electrical suppliers. A common cable tie or zip tie is a plastic strip with an eyelet, the strip including a ratchet surface and the eyelet including a resilient pawl engageable with the ratchet surface. Alternatively forward and rear flexible strap connectors 7, 8 can be a metal strip with crimped connectors, a fabric strip with hook and loop (Velcrom) fasteners or an adhesive tape strip.

Referring to FIGS. 8 and 9, the forward and rear arms 9, 10 have nested sliding inward ends and operate in a telescoping manner to adjust in length. The interlocking mechanical fasteners shown comprise bolts 11 but other locking fasteners are equally applicable. The nested sliding inward ends of one of the forward arm 9 and the rear arm 10 in the example illustrated show a number of spaced apart slotted apertures 12 and two interlocking threaded bolts 11, but other arrangements are possible to provide sufficient amounts of length adjustment.

As seen in FIGS. 8-9, the nested sliding inward ends of the arms 9, 10 are channels or C-shaped with flanges 14 upwardly extending from a web 15. In the example illustrated, the nested sliding inward end of the forward arm 9 surrounds the nested sliding inward end of the rearward arm 10 and the upwardly extending flanges 14 of the forward arm include bent over return edges 16 slidingly engaging the upwardly extending flanges 14 of the rear arm 10.

Figure 10:
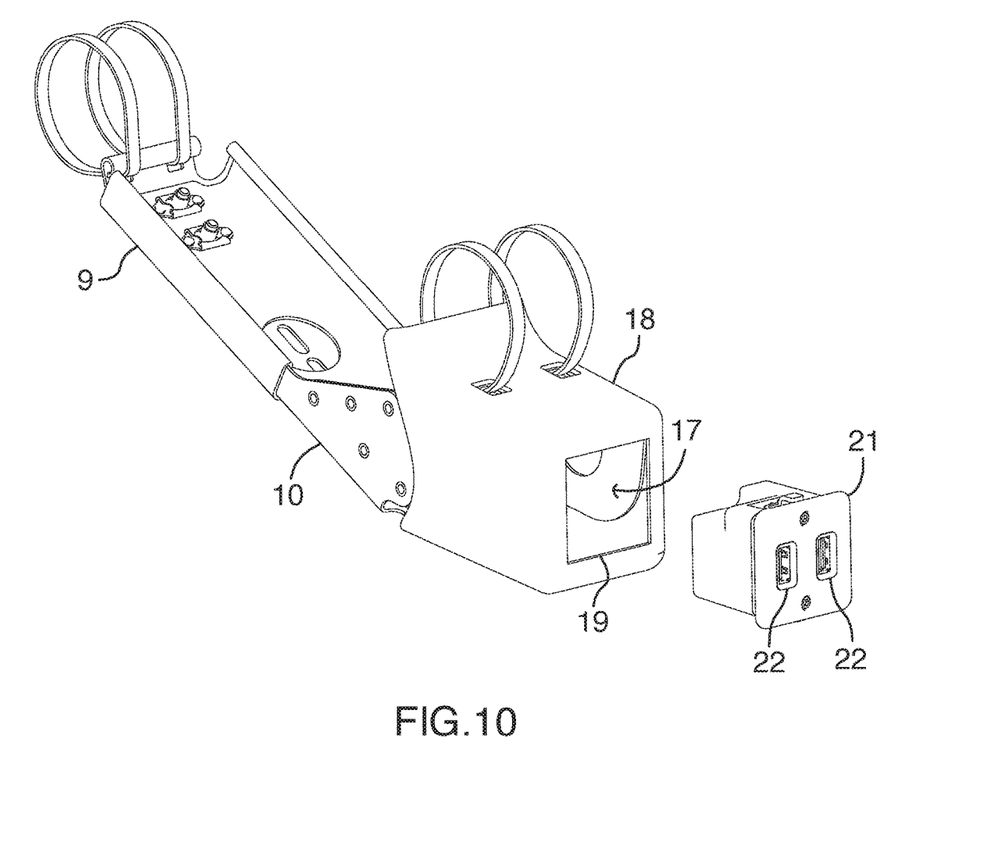
FIG. 10 is an assembled view of the cover and bracket with a dual USB port power outlet cartridge.

FIG. 9 shows an outlet support 17 disposed on a rear portion of the rear arm 10. As indicated in FIG. 10, a removable cover 18 includes an opening 19 for the face of the power outlet and strap apertures 20. The cover 18 is secured by passing the rear strap connectors 8 through strap apertures 20 in the cover and straps apertures 13 in the outlet support 17 as indicated in FIG. 10. The tightening of the strap connectors 7, 8 about the beams 5, 6 (see FIG. 6) also secures the cover 18 to the outlet support 17.

Figure 11:
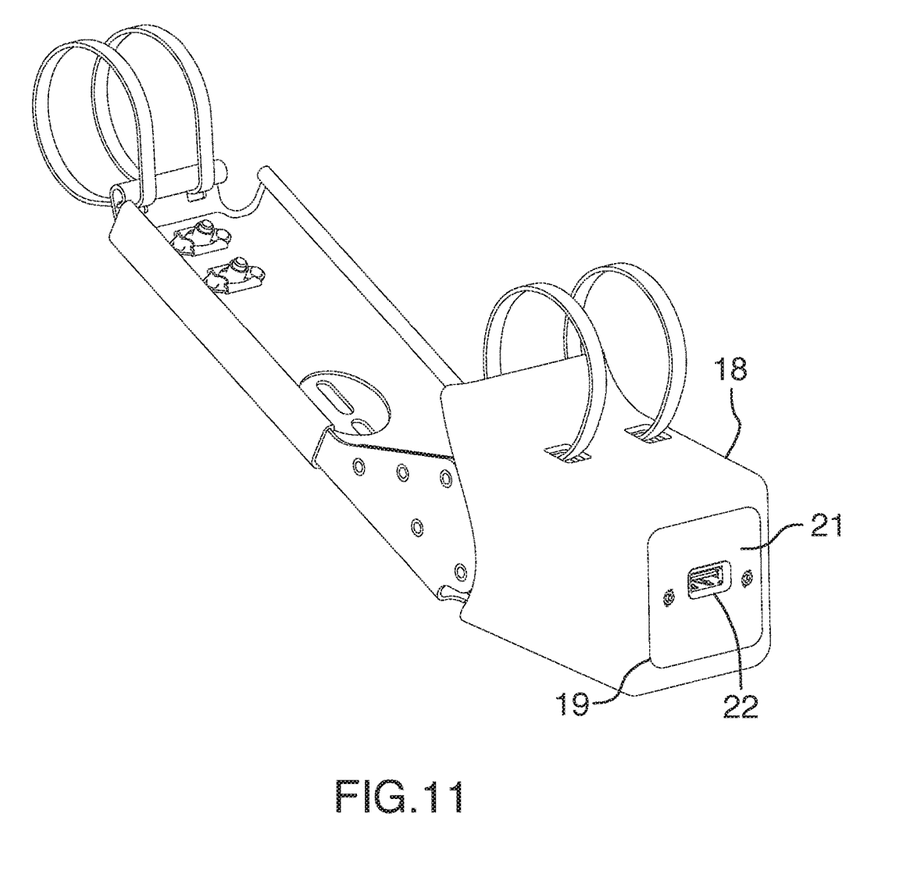
FIG. 11 is similar to FIG. 10 with a single USB cartridge installed in the housing and cover.
Figure 12:
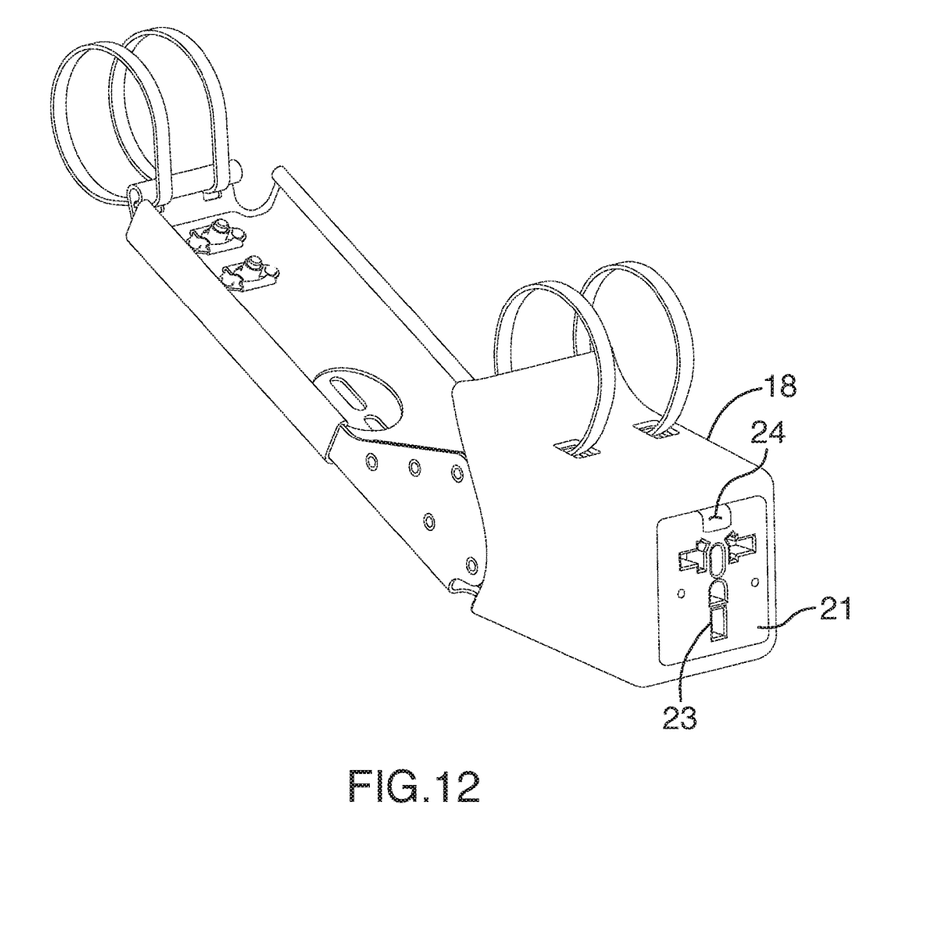
FIG. 12 is similar to FIGS. 10-11 but with a Multi socket electrical power adapter outlet.

Referring to FIG. 10, the bracket 2 includes an interchangeable electric power cartridge 21 connected to the outlet support 17 and cover 18. Each type of interchangeable cartridge 21 has a rearward facing power outlet. In FIG. 10, the outlet shown has two USB (universal serial bus) outlets 22. FIG. 11 shows an alternative cartridge with a single USB outlet 22. In the example shown in FIG. 12, the electric power cartridge 21 includes a multi socket electrical adapter outlet 23 and a power use indicator light 24. Of course the outlet 23 could also be configured as an AC electric power outlet, a USB C (electric power and data communication outlet) or any combination thereof.

In every case shown in FIGS. 9-12, the removable cover 18 at least partially surrounds and protects the electric power cartridge 21. The electric power cartridge 21 has a rear projecting face projecting through the opening 19 in the cover 18 (see FIGS. 9-11). The electric power cartridges 21 are connected with wire harnesses to the aircraft power supply. Although the above description relates to a specific preferred embodiment as presently contemplated by the inventor, it will be understood that the invention in its broad aspect includes mechanical and functional equivalents of the elements described herein.

The invention claimed is:

1. A bracket for providing the fast, easy and certifiable installation of an electric power or data outlet onto an aircraft passenger seat, the seat including a frame with a forward lateral beam spaced apart from a rear lateral beam by a distance; the bracket comprising:
    a forward arm having a forward flexible strap connector adapted to surround the forward lateral beam;
    a rear arm having a rear flexible strap connector adapted to surround the rear lateral beam; and
    an adjustable length connector joining the forward and rear arms for accommodating variation in said distance;
    an outlet support disposed on a forward or rearward portion of the forward or rear arm.

2. The bracket according to claim 1 comprising:
    an electric power cartridge having a rearward facing power outlet connected to the outlet support.

3. The bracket according to claim 2, wherein the electric power/data cartridge comprises at least one of: an AC power outlet, a USB outlet or both.

4. The bracket according to claim 3 comprising a removable cover at least partially surrounding the electric power/data cartridge, and wherein the electric power/data cartridge has a forward or rearward projecting face projecting through an opening in the cover.

5. The bracket according to claim 1 wherein the forward and rear flexible strap connectors are adjustable in length.

6. The bracket according to claim 5 wherein the forward and rear flexible strap connectors comprise one of: a plastic strip with an eyelet, the strip including a ratchet surface and the eyelet including a resilient pawl engageable with the ratchet surface; a metal strip; a fabric strip with hook and loop fasteners; and an adhesive tape strip.

7. The bracket according to claim 1 wherein the forward and rear arms include nested sliding inward ends and interlocking mechanical fasteners.

8. The bracket according to claim 7 wherein the nested sliding inward ends of one of: the forward arm; and the rear arm, includes a plurality of spaced apart openings and the interlocking mechanical fasteners comprise threaded bolts.

9. The bracket according to claim 7 wherein the nested sliding inward ends are C-shaped with upwardly extending flanges.

10. The bracket according to claim 7 wherein the nested sliding inward end of the forward arm surrounds the nested sliding inward end of the rear arm, and wherein the upwardly extending flanges of the forward arm include return edges slidingly engaging the upwardly extending flanges of the rear arm.

11. The bracket according to claim 1 wherein the forward and rear arms include apertures through which the flexible strap connectors extend.

* * * * *